United States Patent
Needham (10) Patent No.: US 8,115,937 B2
(45) Date of Patent: Feb. 14, 2012

(54) METHODS AND APPARATUS FOR MEASURING MULTIPLE FABRY-PEROT GAPS

(75) Inventor: David B. Needham, Magnolia, TX (US)

(73) Assignee: Davidson Instruments, The Woodlands, TX (US)

( * ) Notice: Subject to any disclaimer, the term of this patent is extended or adjusted under 35 U.S.C. 154(b) by 302 days.

(21) Appl. No.: 11/893,434

(22) Filed: Aug. 16, 2007

(65) Prior Publication Data

US 2008/0043245 A1 Feb. 21, 2008

Related U.S. Application Data

(60) Provisional application No. 60/838,063, filed on Aug. 16, 2006.

(51) Int. Cl.
*G01B 11/02* (2006.01)
(52) U.S. Cl. .................... 356/506; 356/450; 356/519
(58) Field of Classification Search .................. 356/477, 356/478, 480, 506, 519
See application file for complete search history.

(56) References Cited

U.S. PATENT DOCUMENTS

| | | |
|---|---|---|
| 1,432,149 A | 10/1922 | Bellingham |
| 3,923,400 A | 12/1975 | Hardy |
| 4,210,029 A | 7/1980 | Porter |
| 4,329,058 A | 5/1982 | James et al. |
| 4,393,714 A | 7/1983 | Schmidt |
| 4,418,981 A | 12/1983 | Stowe |
| 4,428,239 A | 1/1984 | Johnston |
| 4,572,669 A | 2/1986 | James et al. |
| 4,576,479 A | 3/1986 | Downs |
| 4,583,228 A | 4/1986 | Brown et al. |
| 4,596,466 A | 6/1986 | Ulrich |
| 4,606,638 A | 8/1986 | Sommargren |
| 4,628,211 A | 12/1986 | Ruppert |

(Continued)

FOREIGN PATENT DOCUMENTS

EP 0397388 11/1990

(Continued)

OTHER PUBLICATIONS

R.L. Johson et al. "Miniature Instrument for the Measurement of Gap Thickness Using Ply-Chromatic..", Center for Astronomical Adapitve Optics, Steward Ovserv., U of AZ, Tucson.

(Continued)

*Primary Examiner* — Tarifur Chowdhury
*Assistant Examiner* — Jonathon Cook
(74) *Attorney, Agent, or Firm* — McDonald Hopkins LLC (57) ABSTRACT

Apparatus, methods, and other embodiments associated with measuring multiple Fabry-Perot gaps to determine environmental parameters are described herein. In one embodiment, a system for measuring environmental parameters includes an optical fiber, a first reflective surface, a second reflective surface, a third reflective surface, and a light source. The first reflective surface is positioned proximate to a first end of the optical fiber. The second reflective surface is positioned to form a first Fabry-Perot gap between the first reflective surface and the second reflective surface. The third reflective surface is positioned to form a second Fabry-Perot gap between the second reflective surface and third reflective surface. The light source provides light to the optical fiber, wherein the optical fiber delivers light from the light source to the first Fabry-Perot gap and the second Fabry-Perot gap and the optical fiber receives reflected light from the first Fabry-Perot gap and the second Fabry-Perot gap.

18 Claims, 9 Drawing Sheets

U.S. PATENT DOCUMENTS

| | | | |
|---|---|---|---|
| 4,640,616 A | 2/1987 | Michalik | |
| 4,647,203 A | 3/1987 | Jones et al. | |
| 4,648,083 A | 3/1987 | Giallorenzi | |
| 4,668,889 A | 5/1987 | Adams | |
| 4,678,909 A | 7/1987 | Jackson et al. | |
| 4,682,500 A * | 7/1987 | Uda | 73/705 |
| 4,729,654 A | 3/1988 | Akuta et al. | |
| 4,755,668 A * | 7/1988 | Davis | 250/227.27 |
| 4,772,786 A | 9/1988 | Langdon | |
| 4,777,358 A | 10/1988 | Nelson | |
| 4,787,741 A | 11/1988 | Udd et al. | |
| 4,806,016 A | 2/1989 | Corpron et al. | |
| 4,844,616 A | 7/1989 | Kulkarni et al. | |
| 4,873,989 A | 10/1989 | Einzig | |
| 4,907,035 A | 3/1990 | Galburt et al. | |
| 4,914,666 A | 4/1990 | Glance | |
| 4,968,144 A | 11/1990 | Thomas et al. | |
| 4,972,077 A | 11/1990 | Willson et al. | |
| 4,995,697 A | 2/1991 | Adamovsky | |
| 5,034,603 A | 7/1991 | Wilson | |
| 5,094,534 A | 3/1992 | Cole et al. | |
| 5,119,024 A | 6/1992 | Popovic et al. | |
| 5,128,537 A | 7/1992 | Halg | |
| 5,128,798 A | 7/1992 | Bowen et al. | |
| 5,148,604 A | 9/1992 | Bantien | |
| 5,177,805 A | 1/1993 | Groger et al. | |
| 5,187,546 A | 2/1993 | Johnston | |
| 5,202,939 A | 4/1993 | Belleville et al. | |
| 5,202,969 A | 4/1993 | Sato | |
| 5,218,418 A | 6/1993 | Layton | |
| 5,218,426 A | 6/1993 | Hall et al. | |
| 5,225,888 A | 7/1993 | Selwyn et al. | |
| 5,239,400 A | 8/1993 | Liu | |
| 5,247,597 A | 9/1993 | Blacha et al. | |
| 5,276,501 A | 1/1994 | McClintock et al. | |
| 5,283,625 A | 2/1994 | Bunn, Jr. | |
| 5,319,981 A | 6/1994 | Mei et al. | |
| 5,351,317 A | 9/1994 | Weber | |
| 5,361,130 A | 11/1994 | Kersey et al. | |
| 5,386,729 A | 2/1995 | Reed et al. | |
| 5,392,117 A | 2/1995 | Belleville et al. | |
| 5,400,140 A | 3/1995 | Johnston | |
| 5,401,956 A | 3/1995 | Dunphy et al. | |
| 5,401,958 A | 3/1995 | Berkcan | |
| 5,420,688 A | 5/1995 | Farah | |
| 5,444,724 A | 8/1995 | Goto | |
| 5,451,772 A | 9/1995 | Narendran | |
| 5,473,428 A | 12/1995 | Lee et al. | |
| 5,477,323 A | 12/1995 | Andrews et al. | |
| 5,509,023 A | 4/1996 | Glance et al. | |
| 5,526,114 A | 6/1996 | Eselun | |
| 5,550,373 A | 8/1996 | Cole et al. | |
| 5,557,406 A | 9/1996 | Taylor et al. | |
| 5,559,358 A | 9/1996 | Burns et al. | |
| 5,631,736 A | 5/1997 | Thiel et al. | |
| 5,641,956 A | 6/1997 | Vengsarkar et al. | |
| 5,646,762 A | 7/1997 | Delavaux et al. | |
| 5,647,030 A | 7/1997 | Jorgenson et al. | |
| 5,657,405 A | 8/1997 | Fujiwara | |
| 5,682,237 A | 10/1997 | Belk | |
| 5,739,945 A | 4/1998 | Tayebati | |
| 5,760,391 A | 6/1998 | Narendran | |
| 5,784,507 A | 7/1998 | Holm-Kennedy et al. | |
| 5,796,007 A | 8/1998 | Panagotopulos et al. | |
| 5,818,586 A | 10/1998 | Lehto et al. | |
| 5,835,214 A | 11/1998 | Cabib et al. | |
| 5,835,645 A | 11/1998 | Jorgenson et al. | |
| 5,847,828 A | 12/1998 | Downs | |
| 5,852,498 A | 12/1998 | Youvan et al. | |
| 5,872,628 A | 2/1999 | Erskine | |
| 5,891,747 A | 4/1999 | Farah | |
| 5,910,840 A | 6/1999 | Furstenau | |
| 5,923,030 A | 7/1999 | Assard et al. | |
| 5,926,591 A | 7/1999 | Labeye et al. | |
| 5,929,990 A * | 7/1999 | Hall | 356/519 |
| 5,949,801 A | 9/1999 | Tayebati | |
| 5,986,749 A | 11/1999 | Wu et al. | |
| 5,999,261 A | 12/1999 | Pressesky et al. | |
| 5,999,262 A | 12/1999 | Dobschal et al. | |
| 6,016,702 A | 1/2000 | Maron | |
| 6,020,963 A | 2/2000 | DiMarzio | |
| 6,057,911 A | 5/2000 | Reich | |
| 6,064,630 A | 5/2000 | Fersht et al. | |
| 6,069,686 A | 5/2000 | Wang et al. | |
| 6,075,613 A | 6/2000 | Schermer et al. | |
| 6,078,706 A | 6/2000 | Nau et al. | |
| 6,088,144 A | 7/2000 | Doerr | |
| 6,115,521 A | 9/2000 | Tran et al. | |
| 6,118,534 A | 9/2000 | Miller | |
| 6,122,415 A | 9/2000 | Blake | |
| 6,137,621 A | 10/2000 | Wu | |
| 6,151,114 A | 11/2000 | Russell | |
| 6,157,025 A | 12/2000 | Katagiri et al. | |
| 6,173,091 B1 | 1/2001 | Reich | |
| 6,178,001 B1 | 1/2001 | Kim | |
| 6,201,289 B1 | 3/2001 | Jou | |
| 6,212,306 B1 | 4/2001 | Cooper et al. | |
| 6,233,262 B1 | 5/2001 | Mesh et al. | |
| 6,281,976 B1 | 8/2001 | Taylor et al. | |
| 6,282,215 B1 | 8/2001 | Zorabedian et al. | |
| 6,289,143 B1 | 9/2001 | Berthold et al. | |
| 6,304,686 B1 | 10/2001 | Yamate et al. | |
| 6,328,647 B1 | 12/2001 | Traudt | |
| 6,330,255 B1 | 12/2001 | Hung | |
| 6,331,892 B1 | 12/2001 | Green | |
| 6,396,605 B1 | 5/2002 | Heflinger et al. | |
| 6,422,084 B1 | 7/2002 | Fernald et al. | |
| 6,425,290 B2 | 7/2002 | Willcox et al. | |
| 6,439,055 B1 | 8/2002 | Maron et al. | |
| 6,469,817 B1 | 10/2002 | Heflinger | |
| 6,486,984 B1 | 11/2002 | Baney et al. | |
| 6,490,038 B1 | 12/2002 | Jung et al. | |
| 6,492,636 B1 | 12/2002 | Chen et al. | |
| 6,492,800 B1 | 12/2002 | Woods et al. | |
| 6,496,265 B1 | 12/2002 | Duncan et al. | |
| 6,501,551 B1 | 12/2002 | Tearney et al. | |
| 6,522,797 B1 | 2/2003 | Siems et al. | |
| 6,538,748 B1 | 3/2003 | Tucker et al. | |
| 6,539,136 B1 | 3/2003 | Dianov et al. | |
| 6,545,760 B1 | 4/2003 | Froggatt et al. | |
| 6,552,799 B1 | 4/2003 | Wright et al. | |
| 6,563,968 B2 | 5/2003 | Davis et al. | |
| 6,583,882 B2 | 6/2003 | Scruggs et al. | |
| 6,594,022 B1 | 7/2003 | Watterson et al. | |
| 6,597,458 B2 | 7/2003 | Tayag et al. | |
| 6,603,560 B1 | 8/2003 | Islam | |
| 6,608,685 B2 | 8/2003 | Wood et al. | |
| 6,612,174 B2 | 9/2003 | Sittler et al. | |
| 6,621,258 B2 | 9/2003 | Davidson et al. | |
| 6,633,593 B2 | 10/2003 | Ksendzov et al. | |
| 6,636,321 B2 | 10/2003 | Bohnert | |
| 6,643,025 B2 | 11/2003 | Degertekin et al. | |
| 6,647,160 B1 | 11/2003 | Chi et al. | |
| 6,650,420 B2 | 11/2003 | Houston et al. | |
| 6,668,105 B2 | 12/2003 | Chen et al. | |
| 6,668,111 B2 | 12/2003 | Tapalian et al. | |
| 6,668,656 B2 | 12/2003 | Fernald et al. | |
| 6,680,472 B1 | 1/2004 | Thingbø et al. | |
| 6,687,011 B1 | 2/2004 | Lee et al. | |
| 6,687,036 B2 | 2/2004 | Riza | |
| 6,690,873 B2 | 2/2004 | Bendett et al. | |
| 6,714,566 B1 | 3/2004 | Coldren et al. | |
| 6,714,700 B2 | 3/2004 | Burger et al. | |
| 6,717,965 B2 | 4/2004 | Hopkins, II et al. | |
| 6,735,224 B2 | 5/2004 | Murry et al. | |
| 6,741,357 B2 | 5/2004 | Wang et al. | |
| 6,747,743 B2 | 6/2004 | Skinner et al. | |
| 6,765,194 B2 | 7/2004 | Holz et al. | |
| 6,771,905 B1 | 8/2004 | Bortz | |
| 6,776,049 B2 | 8/2004 | Johnson et al. | |
| 6,785,004 B2 | 8/2004 | Kersey et al. | |
| 6,791,694 B2 | 9/2004 | Pezeshki | |
| 6,798,940 B2 | 9/2004 | Lee et al. | |
| 6,806,961 B2 | 10/2004 | Hill | |
| 6,820,489 B2 | 11/2004 | Fernald et al. | |
| 6,822,979 B2 | 11/2004 | Daiber | |
| 6,825,934 B2 | 11/2004 | Baney et al. | |

| | | |
|---|---|---|
| 6,829,073 B1 | 12/2004 | Krol et al. |
| 6,829,259 B2 | 12/2004 | Pontis et al. |
| 6,838,660 B2 | 1/2005 | Duncan et al. |
| 6,839,131 B2 | 1/2005 | Kwon |
| 6,842,254 B2 | 1/2005 | Van Neste et al. |
| 6,879,421 B2 | 4/2005 | Clark et al. |
| 6,882,428 B2 | 4/2005 | Baney et al. |
| 6,886,365 B2 | 5/2005 | Rumpf et al. |
| 6,886,404 B2 | 5/2005 | Digonnet et al. |
| 6,894,787 B2 | 5/2005 | Youngner et al. |
| 6,898,339 B2 | 5/2005 | Shah et al. |
| 6,900,896 B2 | 5/2005 | Motamedi et al. |
| 6,901,088 B2 | 5/2005 | Li et al. |
| 6,901,176 B2 | 5/2005 | Balachandran et al. |
| 6,904,070 B2 | 6/2005 | Pontis et al. |
| 6,909,548 B2 | 6/2005 | Duggan |
| 6,915,048 B2 | 7/2005 | Kersey et al. |
| 6,917,736 B1 | 7/2005 | Ersoy |
| 6,921,894 B2 | 7/2005 | Swierkowski |
| 6,925,213 B2 | 8/2005 | Boyd et al. |
| 6,940,588 B2 | 9/2005 | Woodside et al. |
| 6,947,218 B2 | 9/2005 | Turner, III |
| 6,955,085 B2 | 10/2005 | Jones et al. |
| 6,963,404 B2 | 11/2005 | Chang |
| 6,985,235 B2 | 1/2006 | Bao et al. |
| 6,989,906 B2 | 1/2006 | Sandercock |
| 7,002,697 B2 | 2/2006 | Domash et al. |
| 7,009,691 B2 | 3/2006 | Van Wiggeren et al. |
| 7,016,047 B2 | 3/2006 | May |
| 7,019,837 B2 | 3/2006 | Waagaard |
| 7,043,102 B2 | 5/2006 | Okamoto et al. |
| 7,046,349 B2 | 5/2006 | Everall et al. |
| 7,047,816 B2 | 5/2006 | Jones et al. |
| 7,065,108 B2 | 6/2006 | Park et al. |
| 7,134,346 B2 | 11/2006 | Lopushansky et al. |
| 7,139,081 B2 | 11/2006 | DeGroot |
| 7,139,295 B2 | 11/2006 | Tsai et al. |
| 7,173,713 B2 | 2/2007 | Xu et al. |
| 7,230,959 B2 | 6/2007 | Johnson |
| 7,305,158 B2 | 12/2007 | Jeffers et al. |
| 7,355,684 B2 | 4/2008 | Jeffers et al. |
| 7,355,726 B2 | 4/2008 | Jeffers et al. |
| 7,405,829 B2 | 7/2008 | Shen |
| 7,423,762 B2 | 9/2008 | Schmidt |
| 7,434,472 B2 | 10/2008 | Leitko et al. |
| 7,492,463 B2 | 2/2009 | Lopushansky et al. |
| 7,511,823 B2 | 3/2009 | Schultz et al. |
| 2001/0013934 A1 | 8/2001 | Varnham et al. |
| 2002/0015155 A1 | 2/2002 | Pechstedt et al. |
| 2002/0041722 A1 | 4/2002 | Johnson et al. |
| 2002/0109081 A1 | 8/2002 | Tarvin et al. |
| 2002/0167730 A1* | 11/2002 | Needham et al. ............ 359/578 |
| 2002/0186377 A1 | 12/2002 | Kuskovsky et al. |
| 2003/0020926 A1 | 1/2003 | Miron |
| 2003/0025912 A1 | 2/2003 | Hui et al. |
| 2003/0043697 A1 | 3/2003 | Vakoc |
| 2003/0081875 A1 | 5/2003 | Kochergin et al. |
| 2003/0128917 A1 | 7/2003 | Turpin et al. |
| 2003/0132375 A1 | 7/2003 | Blazo |
| 2003/0141440 A1 | 7/2003 | Kim et al. |
| 2003/0159518 A1 | 8/2003 | Sawatari et al. |
| 2003/0184867 A1 | 10/2003 | Clark |
| 2004/0008742 A1 | 1/2004 | Chou et al. |
| 2004/0013040 A1 | 1/2004 | Maas et al. |
| 2004/0013356 A1 | 1/2004 | Wang et al. |
| 2004/0113104 A1 | 6/2004 | Maida, Jr. |
| 2004/0141184 A1 | 7/2004 | Ueki |
| 2004/0151216 A1 | 8/2004 | Tsai et al. |
| 2004/0151438 A1 | 8/2004 | Ferguson |
| 2004/0196874 A1 | 10/2004 | Spiegelberg et al. |
| 2004/0202399 A1 | 10/2004 | Kochergin et al. |
| 2005/0046862 A1 | 3/2005 | Melnyk |
| 2005/0073690 A1 | 4/2005 | Abbink et al. |
| 2005/0105098 A1 | 5/2005 | Johansen et al. |
| 2005/0213870 A1 | 9/2005 | Kersey et al. |
| 2005/0218299 A1 | 10/2005 | Olsen et al. |
| 2005/0231729 A1 | 10/2005 | Lopushansky et al. |
| 2005/0231730 A1 | 10/2005 | Jeffers et al. |
| 2005/0237538 A1* | 10/2005 | Belleville ............ 356/504 |
| 2005/0242096 A1 | 11/2005 | Jaghab |
| 2006/0034569 A1 | 2/2006 | Shih et al. |
| 2006/0126070 A1 | 6/2006 | Kauppinen |
| 2006/0139652 A1 | 6/2006 | Berthold |
| 2006/0146337 A1 | 7/2006 | Hartog |
| 2006/0152733 A1 | 7/2006 | Waagaard |
| 2006/0241889 A1 | 10/2006 | Lopushansky et al. |
| 2006/0274323 A1 | 12/2006 | Gibler et al. |
| 2007/0006663 A1 | 1/2007 | Zerwekh et al. |
| 2007/0064241 A1 | 3/2007 | Needham |
| 2007/0227252 A1 | 10/2007 | Leitko et al. |
| 2007/0252998 A1 | 11/2007 | Berthold et al. |
| 2008/0043245 A1 | 2/2008 | Needham |
| 2008/0174781 A1 | 7/2008 | Berthold et al. |
| 2008/0186506 A1 | 8/2008 | Lopushansky |
| 2008/0297808 A1 | 12/2008 | Riza et al. |
| 2009/0056447 A1 | 3/2009 | Berthold et al. |
| 2009/0086214 A1 | 4/2009 | Chin |

FOREIGN PATENT DOCUMENTS

| | | |
|---|---|---|
| EP | 0400939 | 12/1990 |
| EP | 0452993 | 10/1991 |
| EP | 0549166 | 6/1993 |
| EP | 0571107 | 11/1993 |
| EP | 0957345 | 11/1999 |
| EP | 1586854 | 10/2005 |
| GB | 1168971 | 10/1969 |
| WO | WO99/15858 | 4/1999 |

OTHER PUBLICATIONS

MacDougall, Trevor W. And Sanders, Paul E., "Large Diameter Waveguide Bragg Grating Components and Their Application in Downhill Oil & Gas", Wetherford International, Wallingford, CT.

Wavelength Multiplexing of Micromechanical System Pressure and Temperature Sensors Using Fiber Bragg Gratings and Arrayed Waveguide Gratings, Li et al, Optical Engineering Feb. 2003, p. 431-438.

Optical Fiber Sensor Technology, Grattan and Meggit, 2000, pp. 312-313.

Fiber Optic Sensors, Udd, 1991, p. 147.

IEEE Micro Electromechanical Systems Conference, Feb. 7, 1993, Ft. Lauderdale, FL; pp. 230-235; K. Aratani et al., "Process and design considerations for surface icromachined beams for a tuneable interferometer array in silicon".

Journal of Vacuum Science and Technology: Part A., vol. 8, No. 4, Jul. 1990, New York US; pp. 3606-3613; D. W. Burns et al., "Thin films for micromechanical sensors".

Optical Engineering, vol. 31, No. 8, Aug. 1992, Bellingham US, pp. 1638-1642; D. Angelidis et al., "Optical micromachined pressure sensor for aerospace application".

Sensors and Actuators, vol. 20, No. 1-2, Nov. 15, 1989, Lausanne, CH, pp. 143-151; M. W. Putty et al., "Process integration for active polysilican resonant microstructures".

Sensors and Actuators, A., vol. A21-A23, No. 1-3, Feb. 1990, Lausanne, CH, pp. 387-390, R. M. Pitcher et al., "Optothermal drive of silicon resonators: the influence of surface coatings".

Electronis Letters, vol. 22, No. 21, Oct. 9, 1986, Stevenage, GB, pp. 1097-1099, M. V. Andres et al., "Optical activation of a silicon vibrating sensor".

IEE Proceedings D. Control Theory & Applications, vol. 135, No. 5, Sep. 1988, Stevenage, GB, pp. 364-368, M. J. Tudor et al., "Silicon resonator sensors: interrogation techniques and characteristics".

"Singe Mode Fiber Optics", 1983, Jeunhomme, p. 100.

Proc. SPIE, vol. 3762, 1999, R. L. Johnson, et al. "Miniature Instrument for the Measurement of Gap Thickness Using Polychromatic Interferometry".

IEEE Sensors Journal, vol. 3, No. 6, pp. 812-817, Dec. 2003, Tseng et al. "Polymer MEMS-Based Fabry-Perot Shear Stress Sensor".

Proc. SPIE, vol. 5589, 2004, MacDougall, Trevor W. and Sanders, Paul E., "Large Diameter Waveguide Bragg Grating Components and Their Application in Downhill Oil & Gas".

Alan D. Kersey.; Fiber Grating Sensors; Journal of Lightwave Technology, vol. 15, No. 8, Copyright 1997 IEEE.

J.R. Clowes, et al.; Effects of High Temperature and Pressure on Silica Optical Fiber Sensors; IEEE Photonics Technology Letters, vol. 10. No. 3; Copyright 1998 IEEE.

J.M. Senior; Multiplexing Techniques for Noninterferometric Optical Point-Sensor Networks; A Review, Fiber and Integrated Optics, 17:3-20; Copyright 1998 Taylor & Francis.

Chi Chiu Chan, et al.; Performance Analysis of a Time-Division-Multiplexed Fiber Bragg Grating Sensor Array by Use of a Tunable Laser Source, IEEE Journal of Selected Topics in Quantum Electronics, vol. 6, No. 5: Copyright 2000 IEEE.

* cited by examiner

METHODS AND APPARATUS FOR MEASURING MULTIPLE FABRY-PEROT GAPS

CROSS-REFERENCE TO RELATED APPLICATIONS

This application claims priority from U.S. Provisional Patent Application No. 60/838,063 entitled "METHOD TO MEASURE MULTIPLE FABRY-PEROT GAPS WITH ONE OPTICAL FIBER" filed on Aug. 16, 2006, which is hereby incorporated by reference in its entirety.

FIELD OF INVENTION

Generally, the present invention relates to measuring multiple Fabry-Perot gaps and, more specifically, the present invention relates to measuring multiple Fabry-Perot gaps with a single optical fiber.

BACKGROUND

The use of a Fabry-Perot gap to measure an environmental parameter, such as temperature or pressure, is known in the art. Typically an optical fiber is associated with a Fabry-Perot gap arranged to measure environmental parameters. This optical fiber delivers light to the gap and receives light reflected from the gap. The light received from the gap is transmitted to a detector for evaluation. If more than one environmental parameter is to be measured, a second Fabry-Perot gap is used, along with a second optical fiber that is associated with the second Fabry-Perot gap. This second optical fiber delivers light to the second gap and receives light reflected from the second gap. The light reflected from the second Fabry-Perot gap is transmitted to another detector by the second optical fiber for evaluation.

SUMMARY OF INVENTION

Apparatus, methods, and other embodiments associated with measuring multiple Fabry-Perot gaps to determine environmental parameters are described herein. In one embodiment, a system for measuring environmental parameters includes an optical fiber, a first reflective surface, a second reflective surface, a third reflective surface, and a light source. The first reflective surface is positioned proximate to a first end of the optical fiber. The second reflective surface is positioned to form a first Fabry-Perot gap between the first reflective surface and the second reflective surface. The third reflective surface is positioned to form a second Fabry-Perot gap between the second reflective surface and third reflective surface. The light source provides light to the optical fiber, wherein the optical fiber delivers light from the light source to the first Fabry-Perot gap and the second Fabry-Perot gap and the optical fiber receives reflected light from the first Fabry-Perot gap and the second Fabry-Perot gap.

DESCRIPTION OF THE DRAWINGS

In the accompanying drawings, which are incorporated in and constitute a part of this specification, embodiments of the invention are illustrated, which, together with a general description of the invention given above, and the detailed description given below serve to illustrate the principles of this invention. The drawings and detailed description are not intended to and do not limit the scope of the invention or the claims in any way. Instead, the drawings and detailed description only describe embodiments of the invention, and other embodiments of the invention not described are encompassed by the claims.

DETAILED DESCRIPTION

The Detailed Description of the Invention merely describes embodiments of the invention and is not intended to limit the scope of the claims in any way. Indeed, the invention as described by the claims is broader than and unlimited by the embodiments described herein, and the terms in the claims have their full ordinary meaning.

As described herein, apparatus and methods may be designed and arranged to use multiple Fabry-Perot gaps to determine or calculate multiple environmental parameters, while utilizing a single optical fiber to deliver light to and receive reflected light from the multiple Fabry-Perot gaps. Such apparatus and methods may be arranged such that a single optical fiber or fiber optical channel delivers light to at least two Fabry-Perot gaps and receives light reflected from each of the Fabry-Perot gaps. Once the reflective light is received, the optical fiber may deliver the reflected light to a detector. Based on the characteristics of the reflected light, the detector signal is used to calculate the width of each Fabry-Perot gap, which may then be correlated to an environmental parameter, such as temperature, pressure, differential pressure, or vibration.

Figure 1:
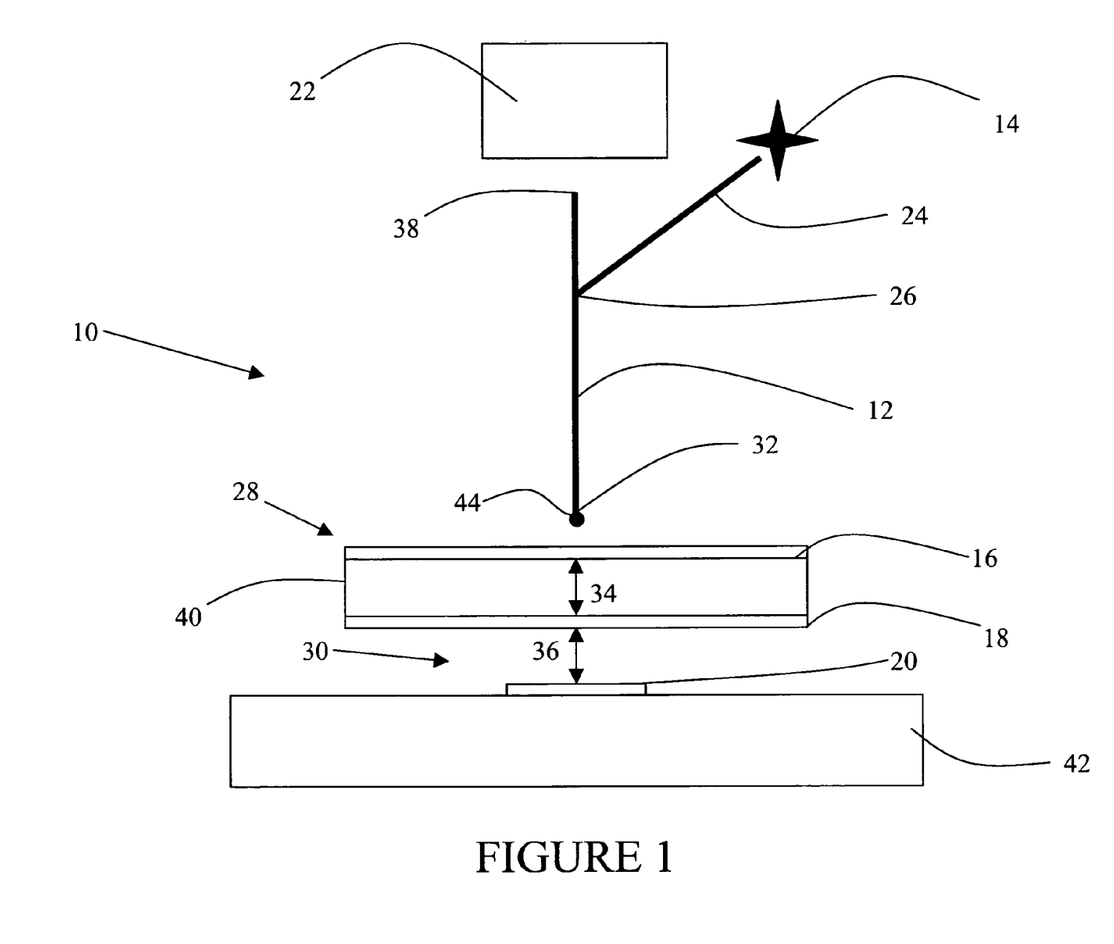
FIG. 1 schematically illustrates an embodiment of a system for measuring environmental parameters.

An exemplary embodiment of a system 10 of components arranged to measure multiple environmental parameters is schematically illustrated in FIG. 1. The system 10 includes a single optical fiber 12, a light source 14, a first reflective surface 16, a second reflective surface 18, a third reflective surface 20, and a detector assembly 22.

The light source 14 is arranged to provide light to the optical fiber 12. In the embodiment illustrated in FIG. 1, the light source 14 provides light to the optical fiber 12 through a short optical lead 24 that intersects the optical fiber 12 through an optical coupler 26. The optical coupler 26 is arranged to transmit light from the light source 14 to the optical fiber 12. The light generated by the light source 14 may be a variety of types of light, such as broadband light with spectral width of hundreds of nanometers, and light from a super luminescent diode with spectral width between approximately 50 nm and 100 nm.

The reflective surfaces 16, 18, 20 are arranged to form a pair of optical sensors arranged to modulate light directed to the sensors. In the embodiment illustrated in FIG. 1, the optical sensors are a pair Fabry Perot interferometers 28, 30. The first reflective surface 16 is positioned proximate to a first end 32 of the optical fiber 12. The second reflective surface 18 is positioned apart from and generally parallel to the first reflective surface 16 to form a Fabry-Perot gap 34 of a first Fabry-Perot interferometer 28. The third reflective surface 20 is positioned apart from and generally parallel to the second reflective surface 18 to form a Fabry-Perot gap 36 of a second Fabry-Perot interferometer 30. As may be seen in FIG. 1, the first and second Fabry-Perot interferometers 28, 30 are positioned in series.

The optical fiber 12 directs light from the light source 14 through the first end 32 of the fiber 12 and to the Fabry-Perot interferometers 28, 30. The interferometers 28, 30 cause spectral modulation of the light and reflect that modulated light back through the first end 32 of the optical fiber 12. The modulated light travels through the optical fiber 12 and is directed to the detector assembly 22, which is positioned proximate to a second end 38 of the optical fiber 12. The interference patterns caused by the spectral modulation of the light may be detected or otherwise observed by the detector assembly 22 as "burst" signals. Such burst signals may be characteristic of the width of the gaps 34, 36 of the interferometers 28, 30. The detection of these burst signals and the calculation of the width of the gaps 34, 36 of the interferometers 28, 30 may be used to calculate environmental parameters such as pressure and temperature.

A ball lens 44 may be located or positioned at the first end 32 of the optical fiber 12 to facilitate the delivery of light to and receipt of reflected light from the interferometers 28, 30. Such a ball lens 44 may assist in maintaining a constant optical path length for all light rays exiting and reentering the first end 32 of the optical fiber 12.

Although surfaces 16, 18, 20 are described as reflective, it will be readily understood that such surfaces may be partially reflective. For example, a reflective surface may be arranged such that it reflects between thirty and thirty-five percent of the light directed to the surface and allows between sixty-five and seventy percent of light to pass through the surface. In such an arrangement, light reflecting from a pair of parallel reflective surfaces causes an interference pattern in the reflected light that may be detected and analyzed to calculate the distance or gap width between the surfaces. Such a gap width calculation may then be compared to earlier or later gap width calculations or to calibration gap widths to determine changes in environmental parameters and calculate the value of the parameter.

In the embodiment illustrated in FIG. 1, the first and second reflective surfaces 16, 18 are secured to generally planar and parallel opposing sides of a substrate 40. The optical thickness of the substrate 40, i.e., the refractive index multiplied times the physical thickness, determines the width of the gap 34 of the first Fabry-Perot interferometer 28. The first and second reflective surfaces 16, 18 may be reflectors adhered to the substrate 40, as shown. In other embodiments, the reflective surfaces 16, 18 may be polished surfaces of the substrate 40, reflective optical coatings deposited on the surfaces of the substrate 40, polished glass material bonded to the substrate 40, or the like. In yet another embodiment, the first and second reflective surfaces 16, 18 may be reflectors positioned and supported a distance apart from each other without the use of a substrate.

As shown in FIG. 1, the system 10 may also include a diaphragm 42. As will be described in detail below, the diaphragm 42 may be arranged to respond to the internal pressure of a vessel, container, or other such enclosure. For example, the diaphragm 42 may be positioned over the opening of a pressurized tank for which the monitoring of the internal pressure of the tank is critical to the operation of a system. The third reflective surface 20 may be a reflector adhered, bonded, or otherwise secured to the surface of the diaphragm 42 that is outside the tank. In other embodiments, the third reflective surface 20 may be a polished surface of the diaphragm 42, a reflective optical coating deposited on the diaphragm 42, a polished glass material bonded to the diaphragm 42, or the like.

In an embodiment, the substrate 40 may be made of a transparent material that experiences physical expansion and contraction due to changes in temperature and also experiences changes in refractive index due to changes in temperature. Most transparent materials are know to exhibit changes in refractive index as the temperature of the material changes, i.e., such materials have a thermally-sensitive refractive index. In such embodiments, light reflected from the first Fabry-Perot interferometer 28 may be detected and analyzed to calculate the temperature of the environment in which the interferometer 28 is located. Similarly, in an embodiment where the third reflective surface 20 is located on the surface of a diaphragm 42, light reflecting from the second Fabry-Perot interferometer 30 may be detected and analyzed to calculate the pressure of the environment bounded by the diaphragm 42.

In an embodiment, the second gap 36 contains or is otherwise filled with air. In another embodiment, the second gap 36 may be positioned or located within a vacuum such that no air or gas fills the gap 36. In yet another embodiment, the gap 36 may contain a transparent or semitransparent medium other than air.

Figure 2:
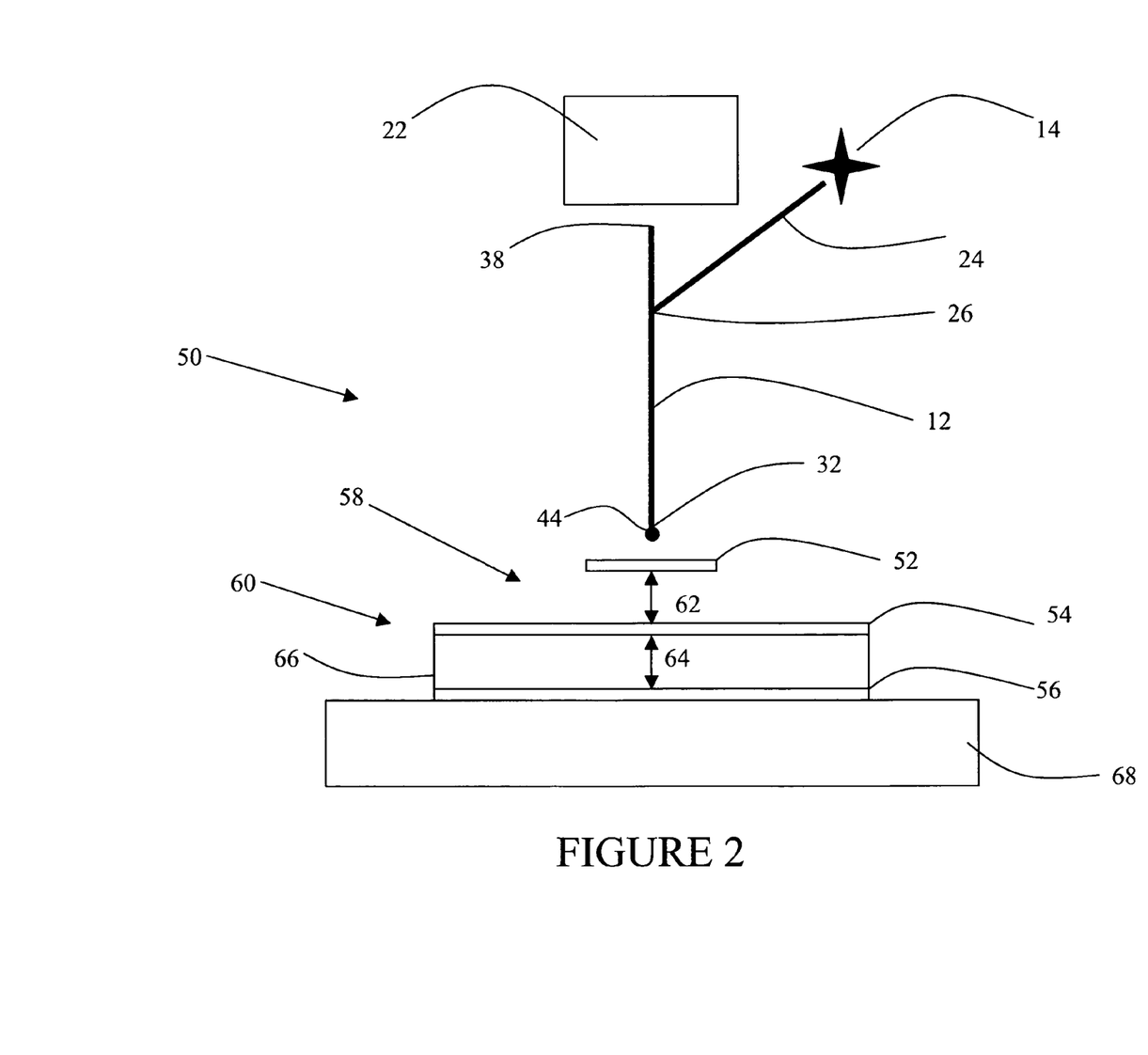
FIG. 2 schematically illustrates another embodiment of a system for measuring environmental parameters.

FIG. 2 schematically illustrates another exemplary embodiment of a system 50 of components arranged to measure multiple environmental parameters. This system 50 is similar to the previously described system 10 illustrated in FIG. 1; however the system 50 of FIG. 2 differs in the arrangement of the Fabry-Perot interferometers 58, 60. The system 50 illustrated in FIG. 2 includes a single optical fiber 12, a ball lens 44, a light source 14, an optical lead 24, an optical coupler 26, and a detector assembly 22 as previously illustrated and described. The system 50 also includes three reflective surfaces 52, 54, 56 positioned or located to form two Fabry-Perot interferometers 58, 60 in series. However, the order of the interferometers 58, 60 is reversed, as compared to FIG. 1.

A first reflective surface 52 is located proximate to the first end 32 of the optical fiber 12. The first reflective surface 52 may be a reflector positioned and supported apart from the first end 32 of the optical fiber 12. A second reflective surface 54 and a third reflective surface 56 are secured to generally planar and parallel opposing sides of a substrate 66. As seen in FIG. 2, the first reflective surface 52 is positioned or located between the first end 32 of the optical fiber 12 and the substrate 66. The first Fabry-Perot interferometer 58 is formed by the gap 62 between the first and second reflective surfaces 52, 54. In an embodiment, the first reflective surface 52 is bonded to, attached to, coated on, or otherwise secured to a transparent material attached to the structure that holds the first end 32 of the optical fiber 12.

A second Fabry-Perot interferometer 60 is formed by the gap 64 between the second and third reflective surfaces 54, 56, with the gap 64 defined by the thickness of the transparent substrate 66. The gap 62 of the first interferometer 58 may contain or is otherwise filled with air. Similar to previous descriptions, in another embodiment, the gap 62 of the first interferometer 58 may be positioned or located within a vacuum such that no air or gas is positioned in the gap 64. In yet another embodiment, the gap 62 of the first interferometer may contain a transparent or semitransparent medium other than air. The substrate 66 may be comprised of a material that expands and contracts due to temperature changes and which also has a thermally-sensitive refractive index.

The second and third reflective surfaces 54, 56 may be reflectors adhered to the substrate 66. In other embodiments, the reflective surfaces 54, 56 may be polished surfaces of the substrate 66, reflective optical coatings deposited on the surfaces of the substrate 66, polished glass material bonded to the substrate 66, or the like.

In an embodiment, the substrate 66 is bonded or otherwise secured to a diaphragm 68 exposed to a pressurized environment. The substrate 66 is secured to the diaphragm such that the entire substrate 66 is displaced as the pressure of the pressurized environment changes and displaces the diaphragm 68. In other embodiments, the third reflective surface 56 is a polished surface of the diaphragm 68, a reflective optical coating deposited on the diaphragm 68, a polished glass material bonded to the diaphragm 68, or the like, where the third reflective surface 56 is secured to or is otherwise in contact with both the substrate 66 and the diaphragm 68.

Using a pair of Fabry-Perot interferometers 28/30, 58/60 with the systems 10, 50 described herein produces a pair of interference patterns in the light reflected from the interferometers 28/30, 58/60. When the pair of interference patterns is delivered to the detector assembly 22 for evaluation, the detector 22 may view the interference patterns as burst signals. The detector assembly 22 may be arranged to differentiate between the burst signals. By differentiating between the burst signals, each burst signal may be separately evaluated to determine or calculate the width of the gaps 34/36, 62/64 represented by the burst signals. These calculated gap widths may then be used to determine or calculate changes in or values of environmental parameter such, as pressure or temperature.

Figure 3:
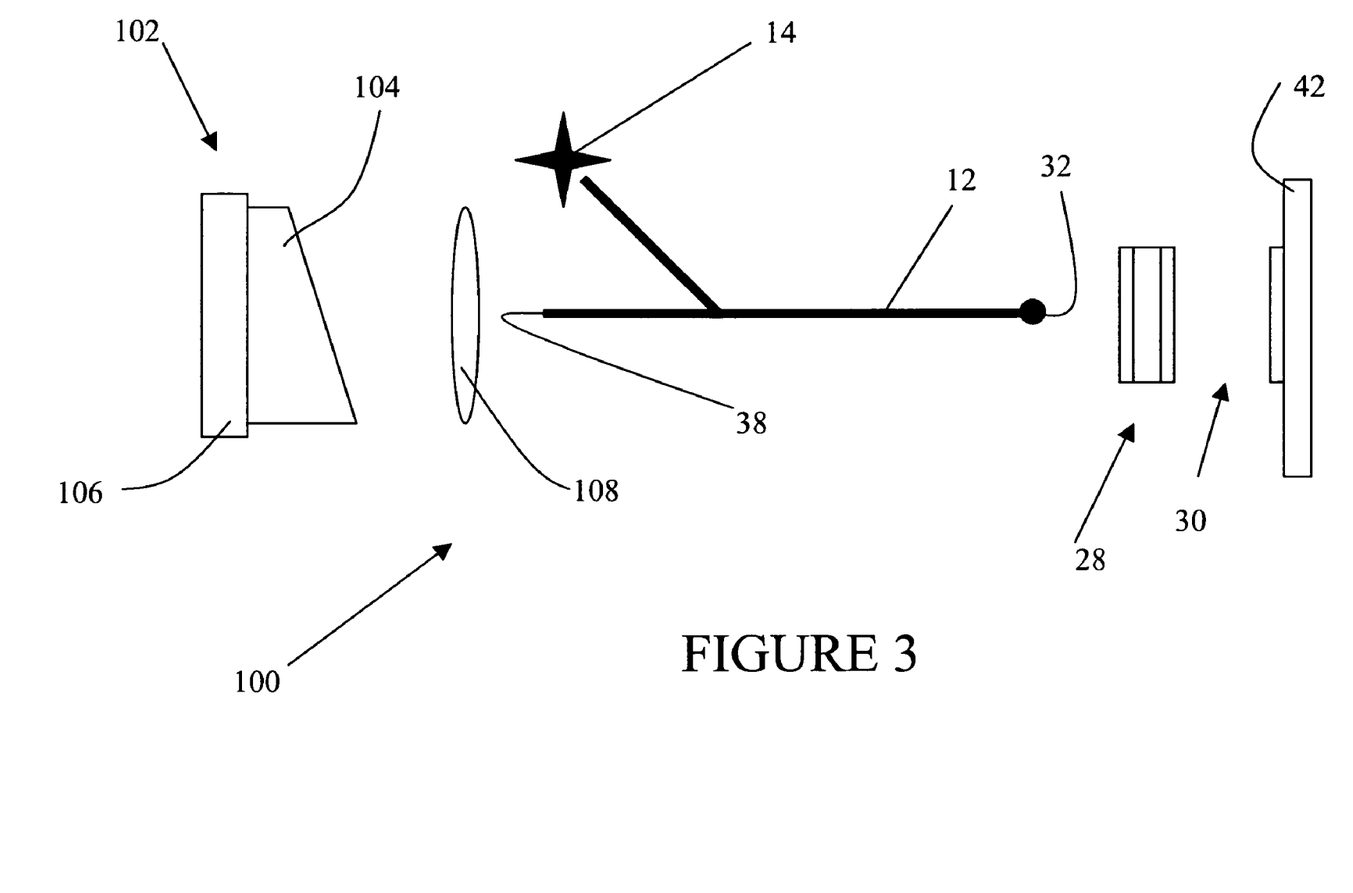
FIG. 3 schematically illustrates another embodiment of a system for measuring environmental parameters.

FIG. 3 schematically illustrates an embodiment of a system 100 where the detector assembly 102 includes a wedge optical cross-correlator 104 attached to a photosensitive array 106. In an embodiment, the wedge optical cross-correlator 104 is a Fizeau wedge and the photosensitive array 106 is a linear charge-coupled device (CCD) array. However, it is understood that individual photosensitive elements such as single photodiode detectors or arrays of single photodiode detectors could be used as well. The system 100 also includes an optical element positioned between the second end 38 of the optical fiber 12 and the detector assembly 102. In the embodiment shown, the optical element 108 is a lens. In other embodiments, the optical element 108 may be a mirror, a cylindrical lens, a cylindrical mirror, or the like. As will be further discussed, the detector assembly 102 may be arranged such that multiple burst signals representing multiple Fabry-Perot interferometers 34/36, 62/64 will be detected on different portions of the CCD array 106 such that each burst signals may be isolated and separated from other burst signals. Such an arrangement allows for the detecting and analyzing of multiple burst signals delivered to the detector assembly 102 by a single optical fiber 12.

When Fabry-Perot interferometers 28/30, 58/60 are positioned in series, such as those illustrated in FIGS. 1 and 2, the analysis of each gap width may be affected by any changes in the width of other gaps in series with the analyzed gap. The systems 10, 50 may be arranged to compensate for such an effect. The following description of such exemplary arrangements will refer to the elements of FIG. 1 for convenience; however, it will be appreciated that the description may be applicable to all embodiments.

As the interferometers 28, 30 are in series, and the system 10 is arranged to use a single light source 14 and a single optical fiber 12, any changes to either the first or second gaps 34, 36 must be taken into consideration when analyzing the other gap 34, 36. In an embodiment, the operational ranges of the Fabry-Perot interferometers 28, 30 are arranged such that the operational range of the first interferometer 28 does not overlap or otherwise interfere with the operational range of the second interferometer 30. Such an arrangement may be controlled by establishing different operational ranges for the gap 34 of the first interferometer 28 as compared to the gap 36 of the second interferometers 30. In one example, the expected minimum gap width of the gap 34 of the first interferometer 28 is larger than the expected maximum gap width of the gap 36 of the second interferometer 30. In such an arrangement, the width or size of the gaps 34, 36 should not overlap during normal and expected operation of the system 10.

In addition to avoiding a direct overlap, the operational ranges may be arranged such that a dead zone exists between the operational ranges of the first and second interferometers 28, 30. Such a dead zone will eliminate possible overlaps of burst signals near the extremes of the operational ranges. The addition of the operational range of the gap 34 of the first interferometer 28, the operational range of the gap 36 of the second interferometer 30, and the dead zone should be equal to or less than the operational range detectable by the detector assembly 22.

In one exemplary embodiment, the overall operational range detectable by the detector assembly 22 is at least 20,000 nanometers (nm). Such an embodiment is illustrated by the graph shown in FIG. 4. The first interferometer 28 is arranged to measure environmental temperature. The total amount the gap 34 is expected to change over the operational temperature of the system 10 is 3000 nm. At ambient temperature of the system 10, the gap 34 is set in manufacturing to approximately 17,000 nm wide. At the maximum expected temperature of the system 10 the substrate 40 will expand and the refractive index will change such that the gap 34 will be approximately 20,000 nm wide. The second interferometer 30 is arranged to measure environmental pressure. The total amount the gap 36 is expected to change over the operational pressure of the system 10 is 10,000 nm. At an ambient pressure of the system 10, the gap 36 is set in manufacturing to approximately 16,000 nm wide. At the maximum expected pressure of the system 10 the diaphragm 42 will be displace such that the gap 36 will be reduce to approximately a width of 6,000 nm. Note that the burst signal from the gap between the first reflective surfaces 16 and the third reflective surface 20 is equal to the sum of gaps 34 and 36, which is beyond the measurement range of the detector assembly 22 and thus does not interfere with the measurement of either gap 34 or 36.

Figure 4:
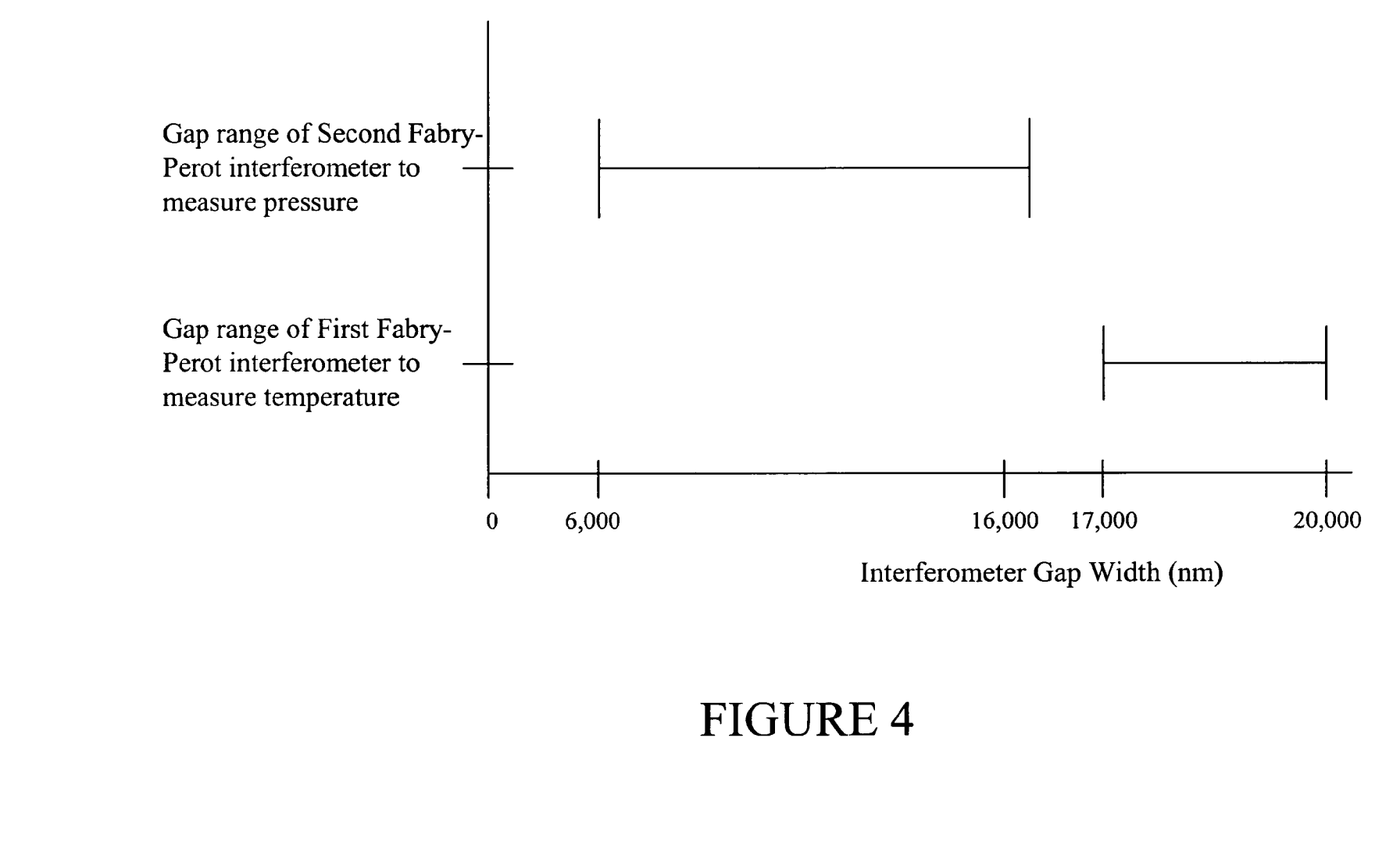
FIG. 4 illustrates a graph representative of operational ranges for Fabry-Perot interferometers for use with embodiments of a system for measuring environmental parameters.

In such an arrangement, the burst signal that represents the gap width of the first interferometer 28 will be detected on the detector assembly 22 at the detection area that corresponds to gap widths between 17,000 and 20,000 nm. The signal burst that represents the gap width of the second interferometer 28 will be detected on the detector assembly 22 at the detection area that corresponds to gap widths between 6,000 and 16,000 nm. As the temperature of system 10 changes, the refractive index change, expansion, and contraction of the substrate 40 will affect the gap 36 of the second interferometer 30 by moving the second reflective surface 18 closer to or farther from the third reflective surface 20. Thus, the analysis of the detected burst signals must correct the measured gap 36 based on the temperature of the measured gap 34. This correction may be performed in software through the use of for example, a lookup table.

As will be appreciated, the non-overlapping operational ranges, along with the 1000 nm dead zone allows the detector assembly 22 to differentiate the burst signal that represents the environmental temperature from the burst signal that represents the environmental pressure. Such an arrangement provides for accurate and reliable determination of gap widths of the interferometers 28, 30 and accurate and reliable calculations of environmental parameters.

Figure 5:
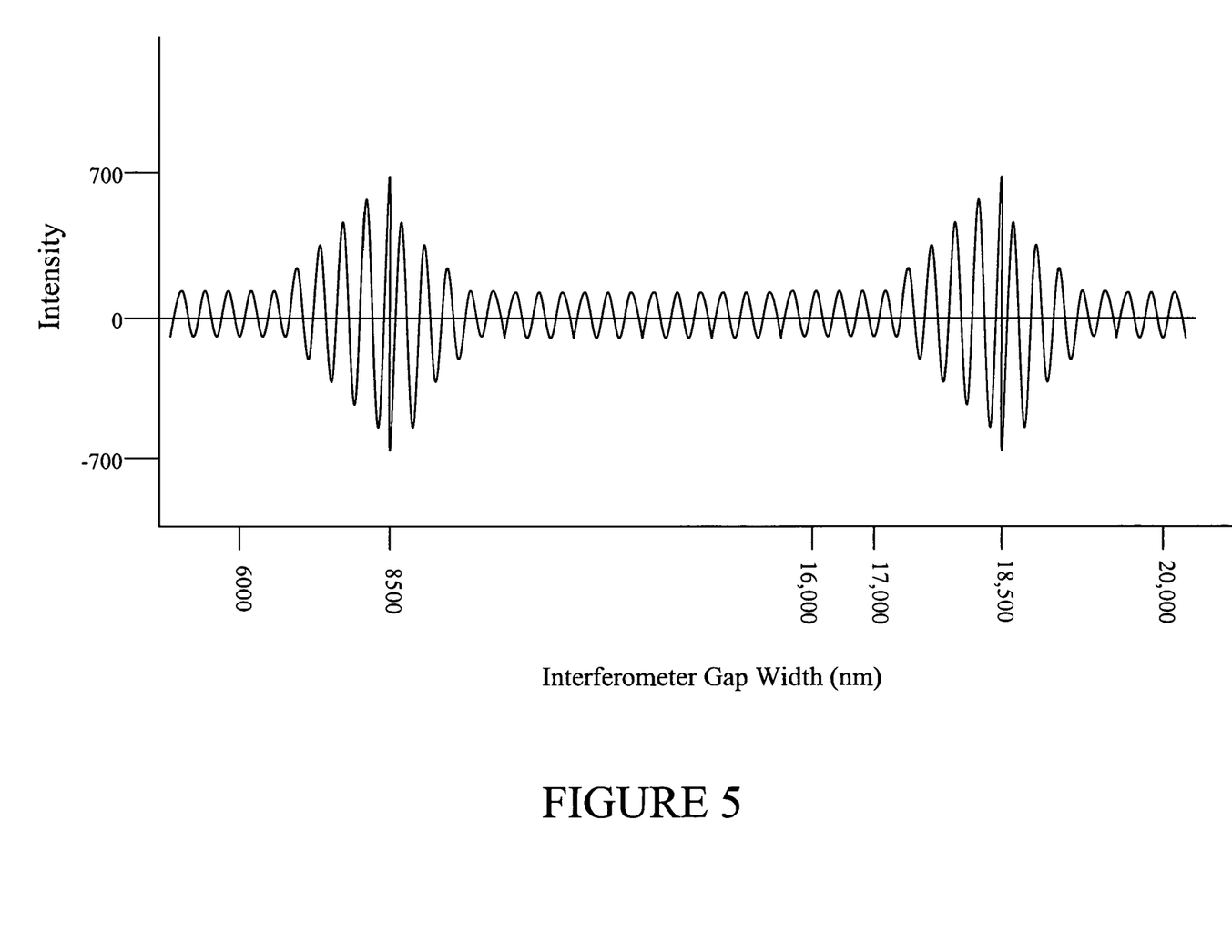
FIG. 5 illustrates a graphical representation of burst signals detected by an embodiment of a system for measuring environmental parameters.

FIG. 5 illustrates a graphical representation of the output signal from a detector assembly 22 detecting a pair of burst signals in light reflected from a pair of Fabry-Perot interferometers 28, 30. In one embodiment, the detector assembly 22 may include a plurality of linearly positioned pixels arranged to detect the intensity of light reflected from the Fabry-Perot interferometers. Such light intensity measurements may be graphed and correlated to gap widths of interferometers, where each pixel number corresponds to a specific gap width.

As shown in FIG. 5, the detector assembly 22 detects intensity of light corresponding to gap widths between 6000 nm and 20,000 nm. The graph shows a first burst signal that is centered on 8500 nm and a second burst signal that is centered on 18,500 nm. If the operational range of the first interferometer 28 is arranged to be 17,000 nm to 20,000 nm, the burst signal centered on 18,500 nm defines the gap width 34 of the first interferometer 28 to be 18,500 nm. Through calibration protocols, software algorithms, and/or look-up tables, every gap width between 17,000 nm and 20,000 nm may be associated with an environmental temperature. Thus, the temperature associated with 18,500 nm may be determined and provided as an output of the environmental temperature measured by the first interferometer 28.

Similarly, if the operational range of the second interferometer 30 is arranged to be 6,000 nm to 16,000 nm, the burst signal centered on 8,500 nm defines the gap width 36 of the second interferometer 30 to be 8,500 nm. Through calibration protocols, software algorithms, and/or look-up tables, every gap width between 6,000 nm and 16,000 nm may be associated with an environmental pressure. Thus, the pressure associated with 8,500 nm may be determined and provided as an output of the environmental pressure measured by the second interferometer 30.

Figure 6:
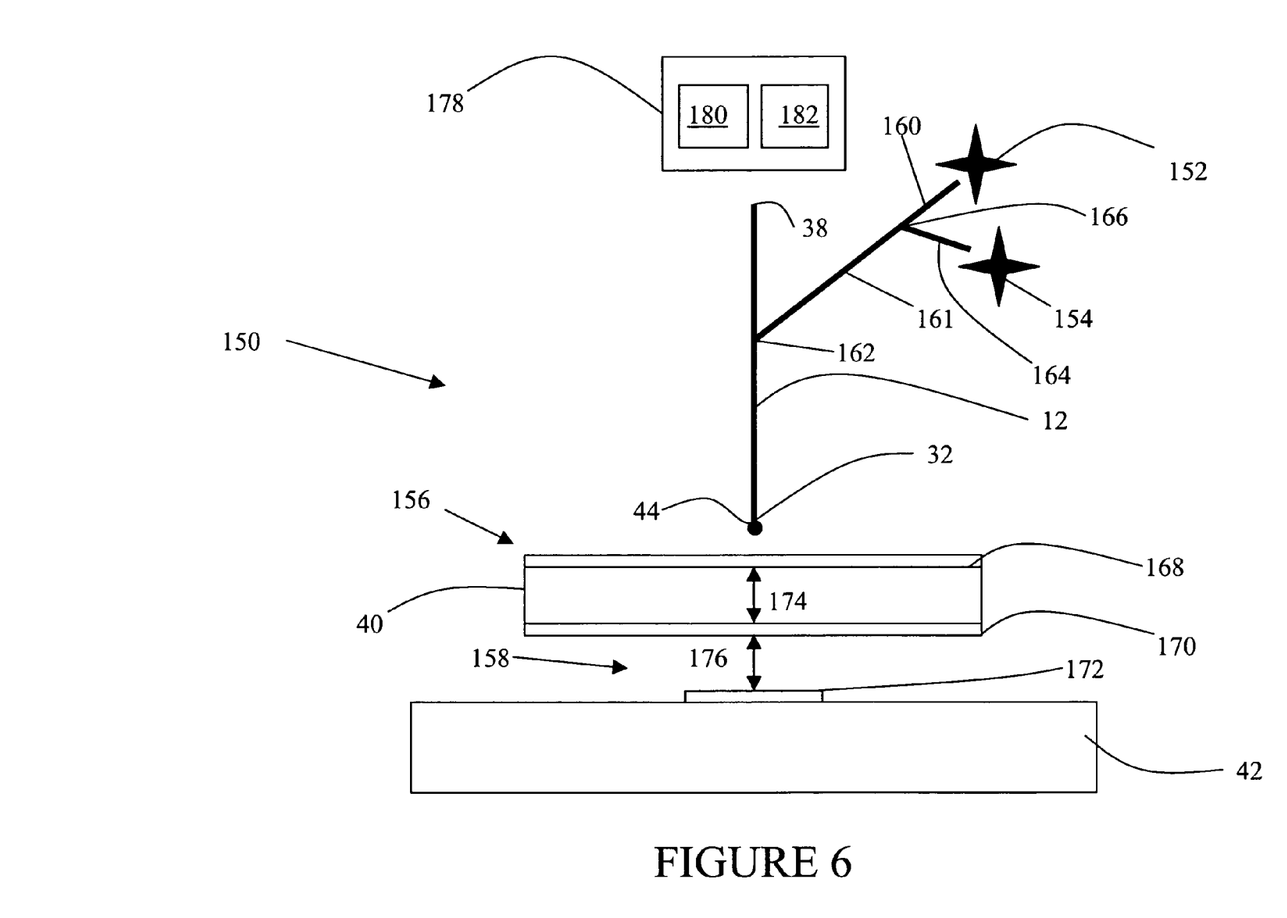
FIG. 6 schematically illustrates an embodiment of a system for measuring environmental parameters.

Another embodiment of a system 150 is schematically illustrated in FIG. 6. This system 150 is similar to that shown in FIG. 1, with the exceptions that a pair of light sources 152, 154 provides light to the optical fiber 12 for delivery to the pair of interferometers 156, 158. A first light source 152 provides light to an optical coupler 166 through a short optical lead 160 and the second light source 154 also provides light to optical coupler 166 through a short optical lead 164. Thus, light from sources 152 and 154 is combined at coupler 166 into optical fiber 161. Light from both sources in optical fiber 161 is provided to optical fiber 12 through another optical coupler 162.

The light sources 152, 154 differ in that the light provided by the first light source 152 has a different wavelength spectrum than light provided by the second light source 154. For example, in one embodiment, the first light source 152 is a light emitting diode (LED) that provides light with a center wavelength of 850 nm and a spectral bandwidth from 810 nm to 890 nm, and the second light sources 154 is an LED that provides light with a center wavelength of 950 nm and a spectral bandwidth from 910 nm to 990 nm.

The system 150 includes a first reflective surface 168, a second reflective surface 170, and a third reflective surface 172 that are spectrally selective. In one example, surface 168 may have a spectrally selective coating that reflects 30 percent of light from source 152 and transmits near 100 percent of light from source 154. In this example, surface 170 reflects 30 percent of light from both sources 152 and 154, and surface 172 reflects 30 percent of light from source 154 and transmits near 100 percent of light source 152. Thus, the spectrally selective reflective surfaces 168, 170, 172 are arranged to produce an interference pattern in the reflected light provided by the first light source 152 that is characteristic of the gap 174 for the first interferometer 156, but not produce an interference pattern in the reflected light provided by the second light source 154 because surface 168 does not reflect light from source 154. Conversely, the spectrally selective reflective surfaces 168, 170, 172 are arranged to produce an interference pattern in the reflected light provided by the second light source 154 that is characteristic of the gap 176 for the second interferometer 158, but not produce an interference pattern in the reflected light provided by the first light source 152 because surface 172 does not reflect light from source 152. In such an arrangement for some applications where discontinuous data collection is acceptable, the detector assembly may include one CCD array and one wedge cross-correlator as in FIG. 1, if light sources 152 and 154 are turned on and off in sequence. In other applications, it may be required to collect continuous data from gaps 174 and 176 and in this case, the detector assembly 178 may include a pair of detectors 180, 182, where each detector consists of a wedge optical cross-correlator and linear CCD array. The wedge optical cross-correlator for the first detector 180 is tuned to the wavelength spectrum of light produced by the first light source 152 and arranged to detect a burst signal produced by the first interferometer 156. The wedge optical cross-correlator for the second detector 182 is tuned to the wavelength spectrum of light produced by the second light source 154 and arranged to detect a burst signal produced by the second interferometer 158. Since separate wedge optical cross-correlators and CCD detectors are used in this embodiment, the entire 6,000 nm to 20,000 nm measurement range of the wedge is available for use with each interferometer. With the light sources turned on and off in sequence and with a single CCD array and wedge optical cross-correlator, the entire 6,000 nm to 20,000 nm measurement range of the wedge is available for use with each interferometer as well. Thus, in this embodiment the interferometers may be designed to operate over a wider range of gap widths than the other embodiments described herein. It will be understood that the above description is exemplary only, and, for example, the system 150 may be arranged such that the first interferometer 156 modulates light produced by the second light source 154 and the second interferometer 158 modulates light produced by the first light source 152.

Figure 7:
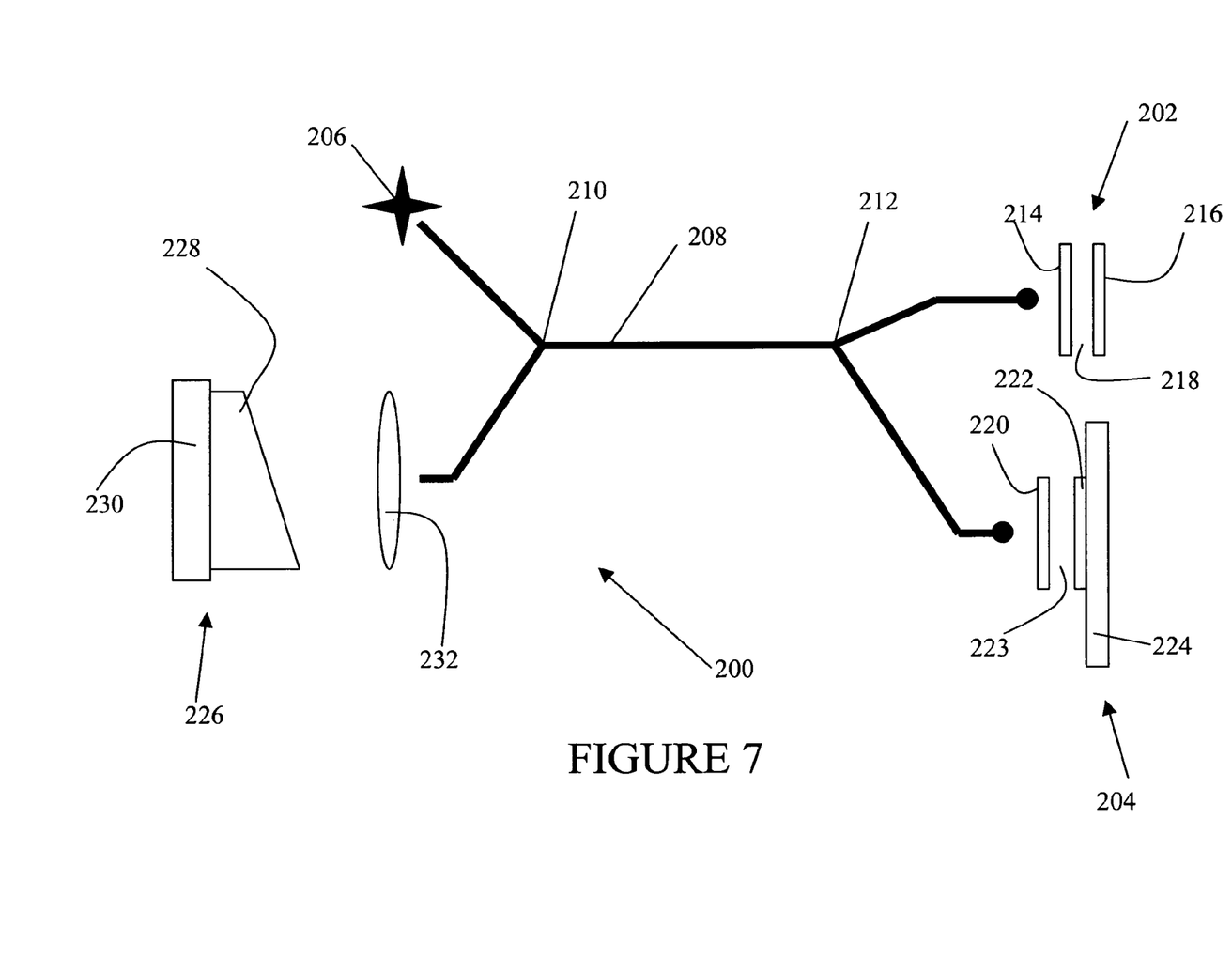
FIG. 7 schematically illustrates an embodiment of a system for measuring environmental parameters.

FIG. 7 schematically illustrates another exemplary embodiment of a system 200 of components arranged to measure multiple environmental parameters. The system 200 includes a pair of Fabry-Perot interferometers 202, 204. In this embodiment, the interferometers 202, 204 are positioned in parallel and not in series. A light source 206 provides light to a single optical fiber 208 through an optical coupler 210, and the optical fiber 208 delivers that light to the interferometers 202, 204. In one example, the light source 206 produces broadband light. The system 200 includes a second optical coupler 212 to split the light for delivery to the interferometers 202, 204 and to recombine light reflected from the interferometers 202, 204.

The pair of interferometers 202, 204 is similar to those described above. The first interferometer 202 includes a first reflective surface 214 and a second reflective surface 216 separated by an air gap 218. The structure that holds the reflective surfaces 214 and 216 may expand as temperature increases and contract as temperature decreases, thus changing the gap as a function of temperature. The first reflective surface 214 is positioned between the optical fiber lead from coupler 212 and the second reflective surface 216. Such an arrangement would make the first interferometer 202 well suited for determining an environmental temperature.

The second interferometer 204 includes a third reflective surface 220 and a fourth reflective surface 222 separated by an air gap 223. The third and fourth reflective surfaces 220, 222 are generally positioned parallel to each other and spaced apart such as to define the gap of the second interferometer 204. The fourth reflective surface 222 may be secured to a diaphragm 224 arranged to respond to a pressurized environment. The third reflective surface 220 is positioned between the end of the optical fiber lead from coupler 212 and the fourth reflective surface 222. Such an arrangement would make the second interferometer 204 well suited for determining an environmental pressure.

The system 200 includes a detector assembly 226 that includes a wedge optical cross-correlator 228 attached to a linear CCD array 230. An optical element 232, such as for example, a lens, is positioned between the optical fiber 208 and the detector assembly 226. The optical fiber 208 delivers light reflected and spectrally modulated by the interferometers 202, 204 to the detector assembly 226.

The first and second interferometers 202, 204 are arranged such that their operational ranges do not overlap and a dead zone exists between these operational ranges. In one exemplary embodiment, the overall operational range detectable by the detector assembly 226 extends from approximately 6,000 nm to 20,000 nm. Such an embodiment is illustrated by the graph shown in FIG. 8. The first interferometer 202 is arranged to measure environmental temperature. The total amount the gap of the first interferometer 202 is expected to change over the operational temperature of the system is 3000 nm. At ambient temperature of the system, the gap is set to a width of approximately 6,000 nm. At the maximum expected temperature of the system the gap 218 will expand to approximately 9,000 nm wide. The second interferometer 204 is arranged to measure environmental pressure. The total amount the gap of the second interferometer 204 is expected to change over the operational pressure of the system is 10,000 nm. At an ambient pressure of the system, the gap is set to a width of approximately 20,000 nm. At the maximum expected pressure of the system the diaphragm 224 displaces such that the width of the gap is reduced to approximately 10,000 nm. In this embodiment, there is a dead zone between 9000 nm and 10,000 nm.

Figure 8:
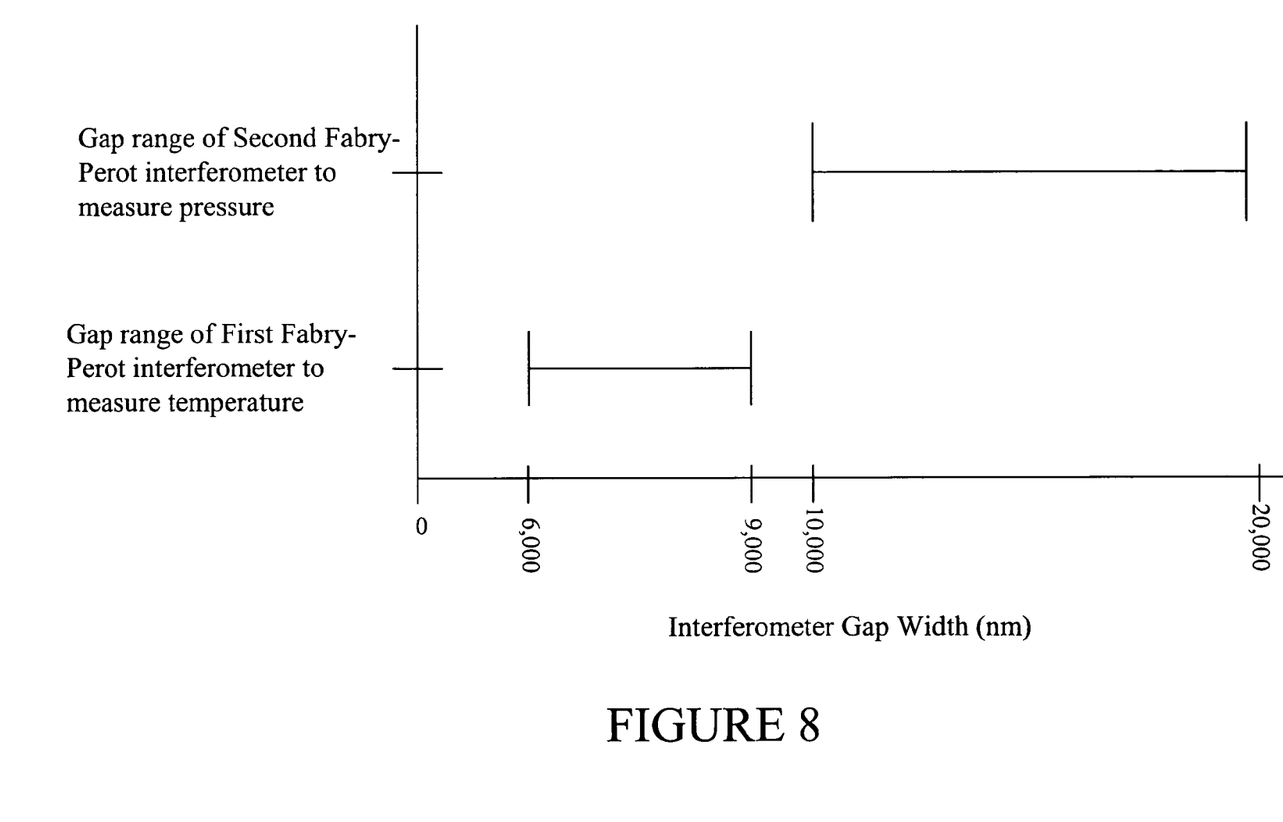
FIG. 8 illustrates a graph representative of operational ranges for Fabry-Perot interferometers for use with embodiments of a system for measuring environmental parameters.

In such an arrangement, the burst signal that represents the gap width of the first interferometer 202 will be detected by the detector assembly 226 in the range that corresponds to gap widths between 6,000 and 9,000 nm. The signal burst that represents the gap width of the second interferometer 204 will be detected by the detector assembly 226 in the range that corresponds to gap widths between 10,000 and 20,000 nm. Such an arrangement allows the detector assembly 226 to differentiate the burst signal that represents the environmental temperature from the burst signal that represents the environmental pressure. Such an arrangement provides for accurate and reliable determination of gap widths of the interferometers 202, 204 and accurate and reliable calculations of environmental parameters.

Figure 9:
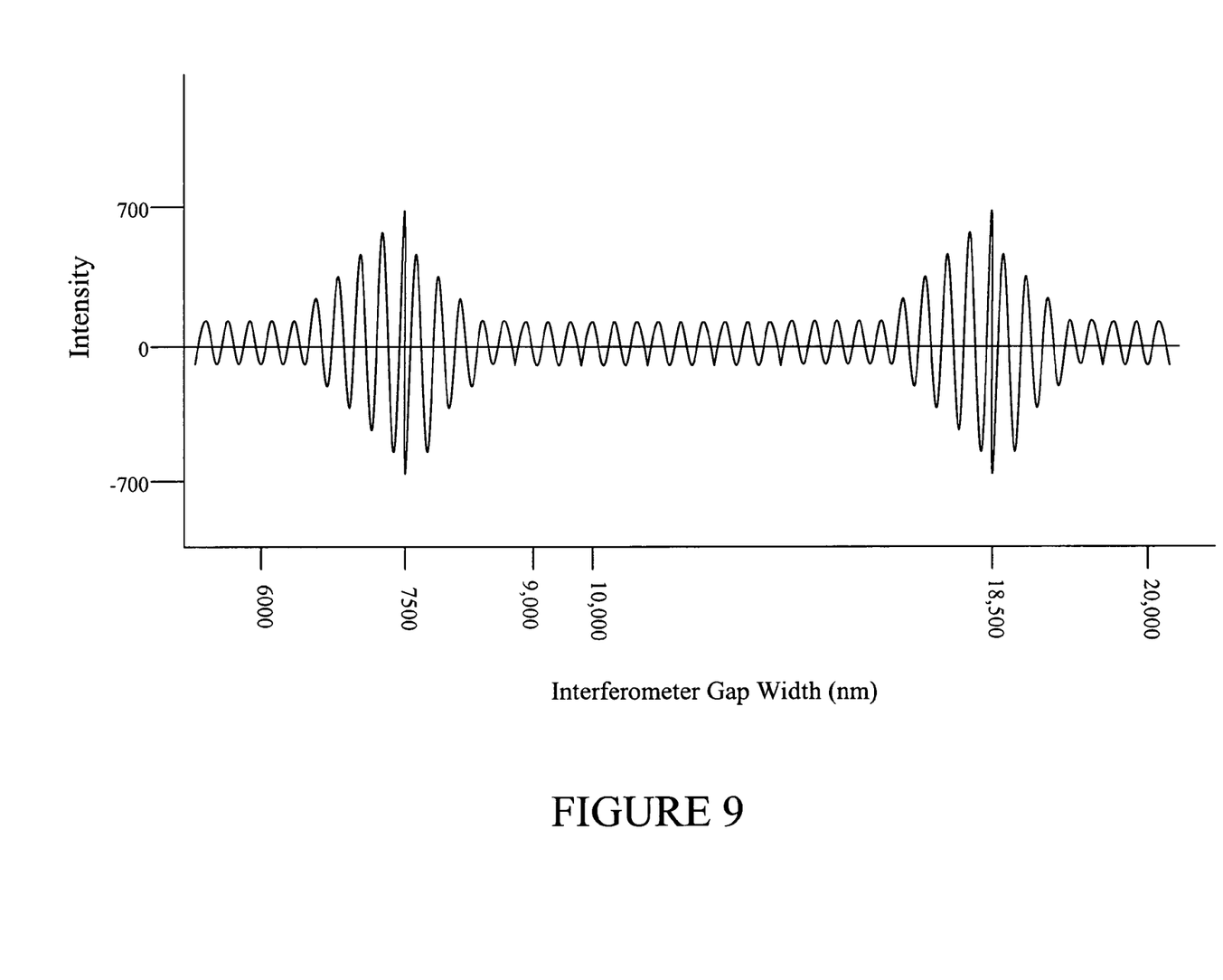
FIG. 9 illustrates a graphical representation of burst signals detected by an embodiment of a system for measuring environmental parameters.

FIG. 9 illustrates a graphical representation of the output signal from a detector assembly 226 detecting a pair of burst signals in light reflected from the pair of Fabry-Perot interferometers 202, 204 of system 200. Such light intensity measurements may be graphed and correlated to gap widths of interferometers, where each pixel number corresponds to a specific gap width. The detector assembly 226 detects a first burst signal centered on 7,500 nm and a second burst signal centered on 18,500 nm. As the operational range of the first interferometer 202 is arranged to be between 6,000 nm and 9,000 nm, the burst signal centered on 7,500 nm determines the gap width of the first interferometer 202 to be 7,500 nm. The system 200 may access software and/or look-up tables that correlate gap width to temperature, retrieve and/or calculate the appropriate temperature, and output the temperature as the environmental temperature of the system.

Similarly, if the operational range of the second interferometer 204 is between 10,000 nm and 20,000 nm, the burst signal centered on 18,500 nm defines the gap width of the second interferometer 30 to be 18,500 nm. The system 200 may access software and/or look-up tables that correlate gap width to pressure, retrieve and/or calculate the appropriate pressure, and output it as the environmental pressure of the system.

While various aspects of the invention are described and illustrated herein as embodied in combination in the exemplary embodiments, these various aspects may be realized in many alternative embodiments not shown, either individually or in various combinations and sub-combinations thereof. Unless expressly excluded herein all such combinations and sub-combinations are intended to be within the scope of the present invention. Still further, while various alternative embodiments as to the various aspects and features of the invention, such as alternative materials, structures, configurations, methods, devices, and so on may be described herein, such descriptions are not intended to be a complete or exhaustive list of available alternative embodiments, whether presently known or later developed. Those skilled in the art may readily adopt one or more of the aspects, concepts or features of the invention into additional embodiments within the scope of the present invention even if such embodiments are not expressly disclosed herein. Additionally, even though some features, concepts or aspects of the invention may be described herein as being a preferred arrangement or method, such description is not intended to suggest that such feature is required or necessary unless expressly so stated. Still further, exemplary or representative values and ranges may be included to assist in understanding the present invention however, such values and ranges are not to be construed in a limiting sense and are intended to be critical values or ranges only if so expressly stated.

I claim:

1. A system for measuring environmental parameters comprising:
   an optical fiber;
   a first reflective surface positioned proximate to a first end of the optical fiber;
   a space between the first end of the optical fiber and the first reflective surface;
   a second reflective surface spaced apart from the first reflective surface;
   a solid substrate having a thermally sensitive refractive index positioned between the first reflective surface and the second reflective surface to form a first temperature sensitive Fabry-Perot gap between the first reflective surface and the second reflective surface;
   a diaphragm;

a third reflective surface connected to a surface of the diaphragm to form a second pressure sensitive Fabry-Perot gap between the second reflective surface and third reflective surface; and a first light source providing light to the optical fiber, wherein the optical fiber delivers light from the first light source to the first Fabry-Perot gap and the second Fabry-Perot gap and the optical fiber receives reflected light from the first Fabry-Perot gap and the second Fabry-Perot gap.

2. The system of claim 1, wherein the first Fabry-Perot gap and second Fabry-Perot gap are located between the diaphragm and the first end of the optical fiber.

3. The system of claim 2 wherein the third reflective surface is one of the following: a polished surface of the diaphragm; a reflective optical coating deposited on the diaphragm; or a polished glass material bonded to the diaphragm.

4. The system of claim 1 wherein the substrate has plane parallel reflective surfaces that define the first and second reflective surfaces.

5. The system of claim 1 further comprising a detector positioned proximate to a second end of the optical fiber.

6. The system of claim 5 further comprising an optical element positioned between the second end of the optical fiber and the detector, where the optical element is one of the following: a lens; a mirror; a cylindrical lens; a cylindrical mirror.

7. The system of claim 6 wherein the detector comprises a Fizeau wedge optical cross-correlator attached to a CCD array.

8. The system of claim 1 further comprising a second light source providing light to the optical fiber that is of a different wavelength than the light from the first light source, wherein the optical fiber delivers light from the second light source to the first Fabry-Perot gap and the second Fabry-Perot gap and the optical fiber received light reflected from at least one of the first Fabry-Perot gap and the second Fabry-Perot gap.

9. The system of claim 8 wherein at least one of the first reflective surface, second reflective surface, and third reflective surface is spectrally selective.

10. The system of claim 8 wherein the first light source and second light source are turned on and off in sequence.

11. The system of claim 1 wherein the first reflective surface is secured to the first end of the optical fiber.

12. A system for measuring environmental parameters comprising:
a first Fabry-Perot gap defined by a first reflective surface and a second reflective surface;
a solid substrate having a thermally sensitive refractive index positioned between the first reflective surface and the second reflective surface;
a second Fabry-Perot gap defined between the second reflective surface and a third reflective surface;
a diaphragm connected to the third reflective surface;
an optical fiber having a first end terminating a distance away from the first and second Fabry-Perot gaps;
a broadband light source providing light to a first end of the optical fiber;
a fiber optical coupler positioned at a second end of the optical fiber to spit light to be delivered to the first and second Fabry-Perot gaps and to recombine light reflected from the first and second Fabry-Perot gaps; and
a detector to detect light recombined by the coupler.

13. The system of claim 12 wherein the detector comprises a wedge optical cross-correlator attached to a CCD array.

14. The system of claim 13 further comprising an optical element positioned between the second end of the optical fiber and the detector, where the optical element is one of the following: a lens; a mirror; a cylindrical lens; a cylindrical mirror.

15. A method for measuring environmental parameters comprising:
providing a first Fabry-Perot gap defined by a first reflective surface and a second reflective surface;
providing a solid substrate having a thermally sensitive refractive index positioned between the first reflective surface and the second reflective surface;
providing a second Fabry-Perot gap defined between the second reflective surface and a third reflective surface;
providing a diaphragm connected to the third reflective surface providing a single optical fiber channel having a first end positioned a distance away from the first and second Fabry-Perot gaps;
providing a light source;
providing light from the light source to the optical fiber channel delivering light from the light source through the optical fiber channel to the first Fabry-Perot gap and the second Fabry-Perot gap;
reflecting light from the first Fabry-Perot gap and the second Fabry-Perot gap to the optical fiber channel;
providing an optical detector; and
delivering light reflected from the first Fabry-Perot gap and the second Fabry-Perot gap through the optical fiber channel to the optical detector.

16. The method of claim 15 further comprising a wedge optical cross-correlator attached to a CCD array.

17. The method of claim 16 further comprising positioning the first Fabry-Perot gap in series with the second Fabry-Perot gap.

18. The method of claim 15 further comprising positioning the first Fabry-Perot gap in parallel with the second Fabry-Perot gap.

* * * * *